(12) United States Patent
Latham et al.

(10) Patent No.: US 6,682,105 B2
(45) Date of Patent: Jan. 27, 2004

(54) REMOTELY OPERABLE MISALIGNMENT COUPLING DEVICE

(75) Inventors: Raymond E. Latham, Houston, TX (US); Gyula Pasztor, Houston, TX (US)

(73) Assignee: Reflange, Inc., Houston, TX (US)

( * ) Notice: Subject to any disclaimer, the term of this patent is extended or adjusted under 35 U.S.C. 154(b) by 29 days.

(21) Appl. No.: 10/137,189

(22) Filed: Apr. 30, 2002

(65) Prior Publication Data

US 2002/0167172 A1 Nov. 14, 2002

Related U.S. Application Data

(60) Provisional application No. 60/288,146, filed on Apr. 30, 2001.

(51) Int. Cl.[7] .............................................. F16L 27/04
(52) U.S. Cl. ..................... 285/261; 285/27; 285/148.28; 285/24
(58) Field of Search ................................. 285/27, 145.3, 285/146.1, 148.4, 148.28, 146.3, 147.3, 263, 261, 276, 271, 24

(56) References Cited

U.S. PATENT DOCUMENTS

| | | | | | |
|---|---|---|---|---|---|
| 1,865,462 | A | * | 7/1932 | Etnyre | 285/27 |
| 2,803,473 | A | * | 8/1957 | Hohmann | 285/261 |
| 3,378,281 | A | * | 4/1968 | Smith | 285/27 |
| 3,661,409 | A | * | 5/1972 | Brown et al. | 285/367 |
| 4,040,650 | A | * | 8/1977 | Shotbolt | 285/18 |
| 4,086,778 | A | * | 5/1978 | Latham et al. | 405/191 |
| 6,257,625 | B1 | * | 7/2001 | Kitani et al. | 285/145.3 |
| 6,305,720 | B1 | * | 10/2001 | Spiering et al. | 285/261 |

* cited by examiner

*Primary Examiner*—Lynne H. Browne
*Assistant Examiner*—Aaron Dunwoody
(74) *Attorney, Agent, or Firm*—Howrey Simon Arnold & White LLP (57) ABSTRACT

A remotely operable coupling device is disclosed. The device is suitable for coupling misaligned first and second conduits. The device includes a first connector and a second connector. The first connector is attached to the first conduit and includes a first flange with a ball end extending therefrom. The second connector is attached to the second conduit and receives the first connector. The second connector includes a first mechanism operable to position a second flange adjacent the first flange and to dispose the ball end into a socket member. The second connector also includes a second mechanism disposed about the adjacent first and second flanges and operable to hold the flanges adjacent one another and maintain the ball end disposed within the socket.

29 Claims, 5 Drawing Sheets

REMOTELY OPERABLE MISALIGNMENT COUPLING DEVICE

CROSS-REFERENCE TO RELATED APPLICATIONS

This application claims priority of the Provisional Application No. 60/288,146 filed Apr. 30, 2001.

FIELD OF THE INVENTION

The present invention relates to a method and apparatus for securely coupling conduits or pipes of various types. The invention also pertains to the ability attach and detach the coupling mechanism as may be desired. The method and apparatus facilitates the use of remotely controlled mechanical devices for the positioning, coupling and detaching of the coupling mechanism. Use of the method and apparatus taught by the present invention includes, but is not limited to underwater hydrocarbon production wells and related or ancillary piping and equipment.

BACKGROUND OF THE INVENTION

Equipment facilitating fluid-tight connection of pipes or other conduits has been a useful technology. Various techniques and designs are known and used in the related fields. A well-known and common example of a simple, relatively fluid-tight connector is a temporary fire hose connection that may be rapidly installed to a fire hydrant. More standard examples of fluid-tight connectors include flanges that are held together by bolts. Such connections often contain different types of seals to prevent leakage of the fluid being conveyed. One of the most secure and permanent methods for joining pipe sections is by welding. Unfortunately, welding does not facilitate removal or replacement of the pipe sections or components attached thereto. Moreover, the difficulties of welding greatly increase when applied to underwater applications.

Standard mechanical fasteners, e.g., flanges secured with bolts, washers, nuts and other hardware, have been commonly used in applications not suitable for welding or other joining or attachment techniques. Unfortunately, the use of such conventional hardware is also limited in under water applications. The dexterity needed to effectively attach the multiple bolts with accompanying washers and threaded nuts to produce and secure a fluid-tight connection creates an encumbrance or impediment in the use of such devices. This limitation is compounded in a deepwater environment where hydrocarbon exploration and production is increasingly being conducted.

Additionally, the installation and attachment with possible future detachment and removal or replacement of manufactured piping and equipment must often permit flexibility during installation. Due to the vagaries of the environment and inability to construct a level and controlled work site in hostile environments, a minimal amount of site preparation may be allowed, which further restricts coupling the components that can provide a secure, fluid-tight connection and have the capacity to attach "misaligned" components.

Consequently, as construction and industrial production activities are increasingly being performed in remote and hostile environments, it is also advantageous to adapt methods and apparatus that may be remotely operated. Remotely operable devices further increase the utility of coupling components to create a secure, fluid-tight connection in a hostile environment.

For all purposes of this disclosure, applicant incorporates by reference as if fully set forth herein the entirety of U.S. Pat. No. 5,368,342.

SUMMARY OF THE INVENTION

One aspect of the present invention provides a device for coupling misaligned first and second conduits, including a first connector and a second connector The first connector is connected to the first conduit and has a first flange disposed about a ball member. The second connector is connected to the second conduit. The second connector includes a second flange disposed about a socket member and includes a first mechanism. The socket member receives the ball member therein, and the second flange positions adjacent the first flange. The first mechanism is operable to retain the first and second flanges adjacent and to maintain the ball member in sealed engagement with the socket member. The second connector may further include a second mechanism operable to engage the socket member with the ball member and to position the second flange adjacent the first flange.

Another aspect of the present invention provides a device for coupling misaligned first and second conduits. The device includes a first connector and a second connector. The first connector includes a ball member and a first flange. The ball member is attached to the first conduit, and the first flange is disposed on the ball member. The second connector receives the first connector and includes a socket member, a second flange, a soft landing mechanism and a coupling mechanism. The socket member is attached to the second conduit, and the second flange is disposed on the socket member. The soft landing mechanism is operable to engage the socket member with the ball member and to position the second flange adjacent the first flange. The coupling mechanism is operable to retain the first and second flanges adjacent and to maintain the ball member and socket member in fluid-tight engagement.

Yet another aspect of the present invention provides a method for remotely coupling misaligned first and second conduits. The method includes the steps of: inserting a first connector attached to the first conduit into a second connector attached to the second conduit; engaging a socket member disposed in the second connector with a ball member disposed on the first connector by operating a soft landing mechanism; and retaining the ball and socket members in fluid-tight engagement by operating a coupling mechanism.

The foregoing summary is not intended to summarize each potential embodiment or every aspect of the invention disclosed herein, but merely to summarize the appended claims.

BRIEF DESCRIPTION OF THE DRAWINGS

The foregoing summary, preferred embodiments, and other features or aspects of the invention will become apparent upon reading the following detailed description and upon reference to the drawings, in which.

While the invention is susceptible to various modifications and alternative forms, specific embodiments thereof have been shown by way of example in the drawings and are herein described in detail. The figures and written description are not intended to limit the breadth or scope of the invention in any manner, rather they are provided to illustrate the invention to a person of ordinary skill in the art by reference to particular embodiments of the invention, as required by 35 USC §112.

DETAILED DESCRIPTION OF THE INVENTION

Figure 1:
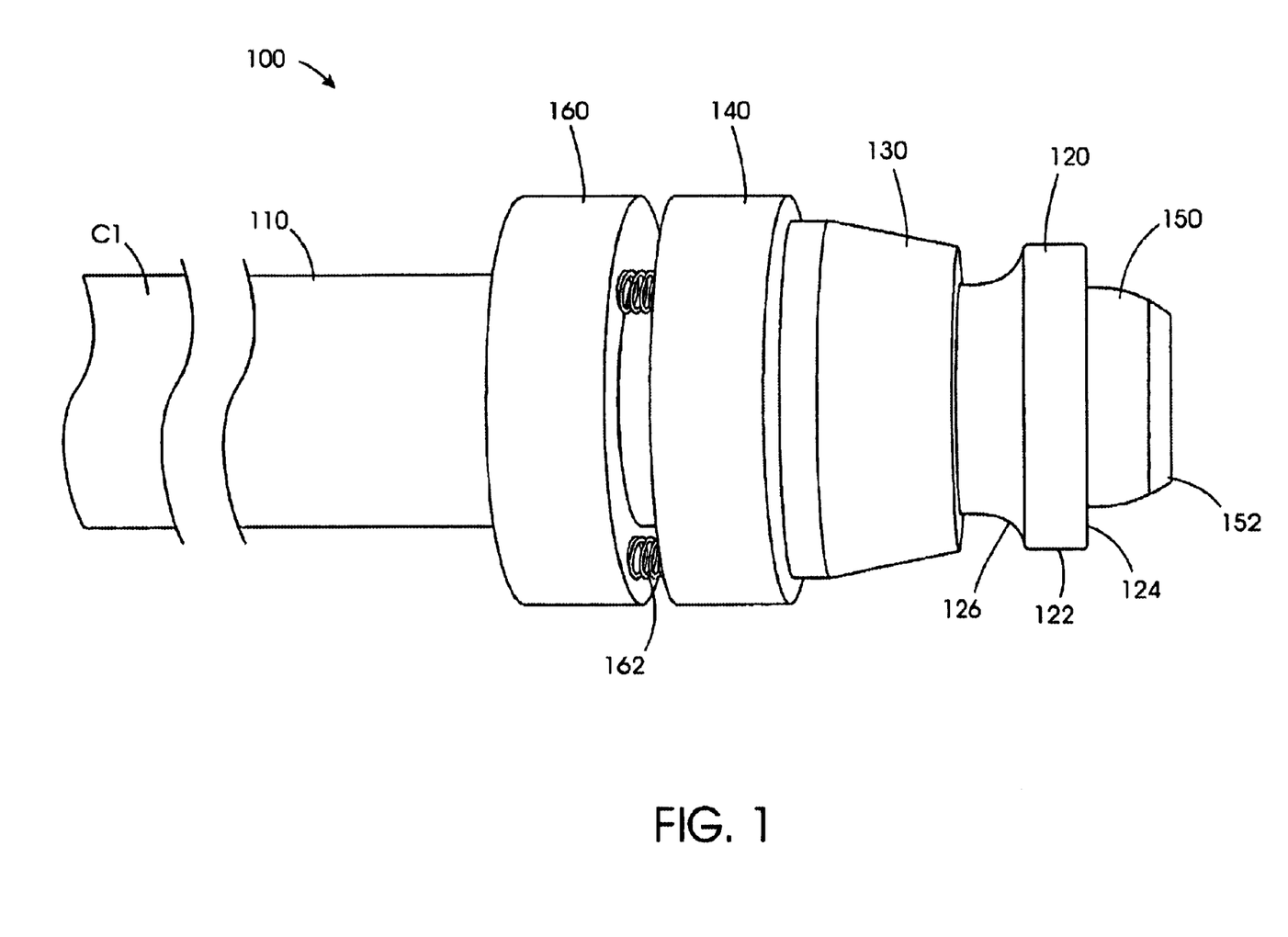
FIG. 1 illustrates an embodiment of an insertion connector in accordance with the present invention.
Figure 2:
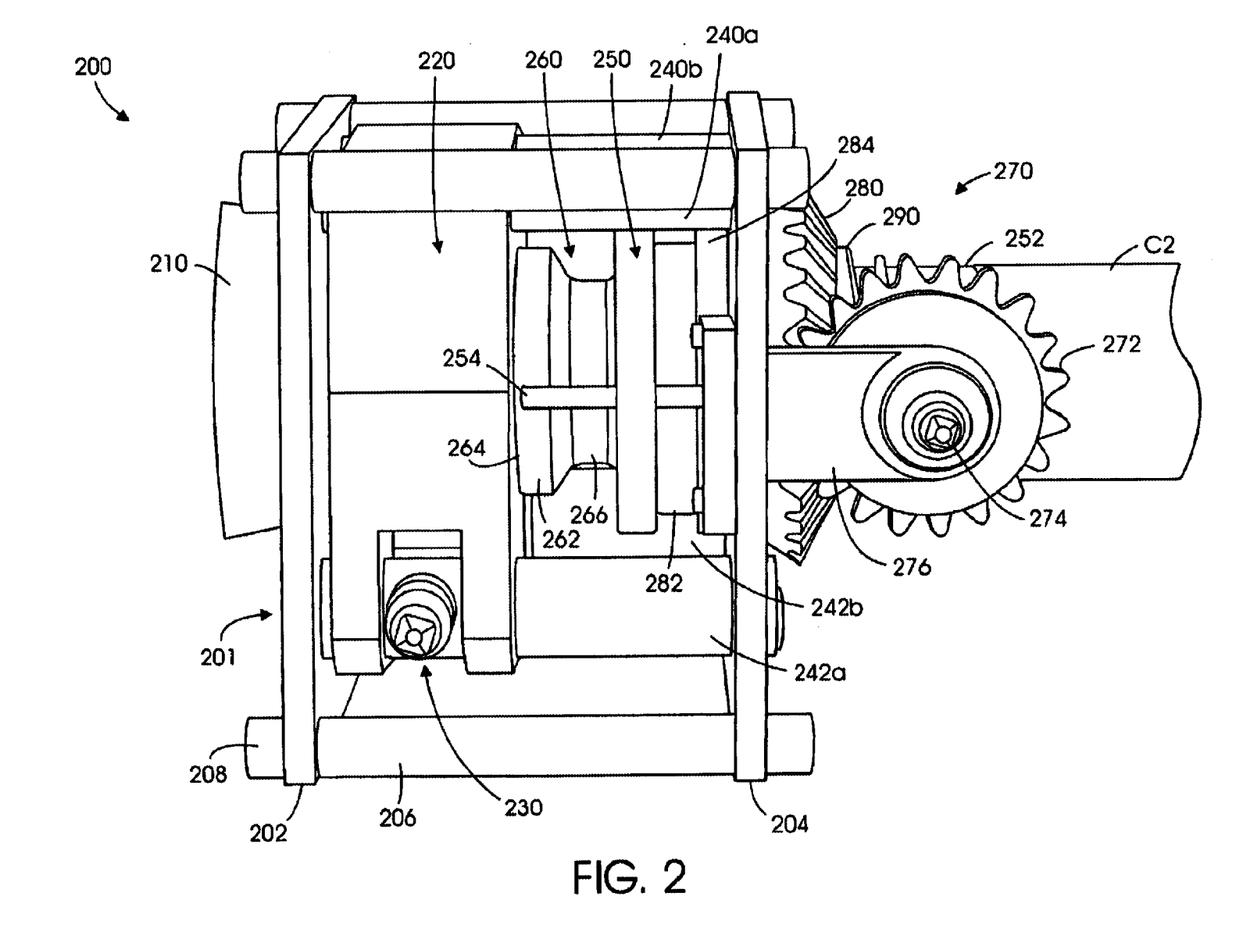
FIG. 2 illustrates an embodiment of a coupling connector in accordance with the present invention.
Figure 3:
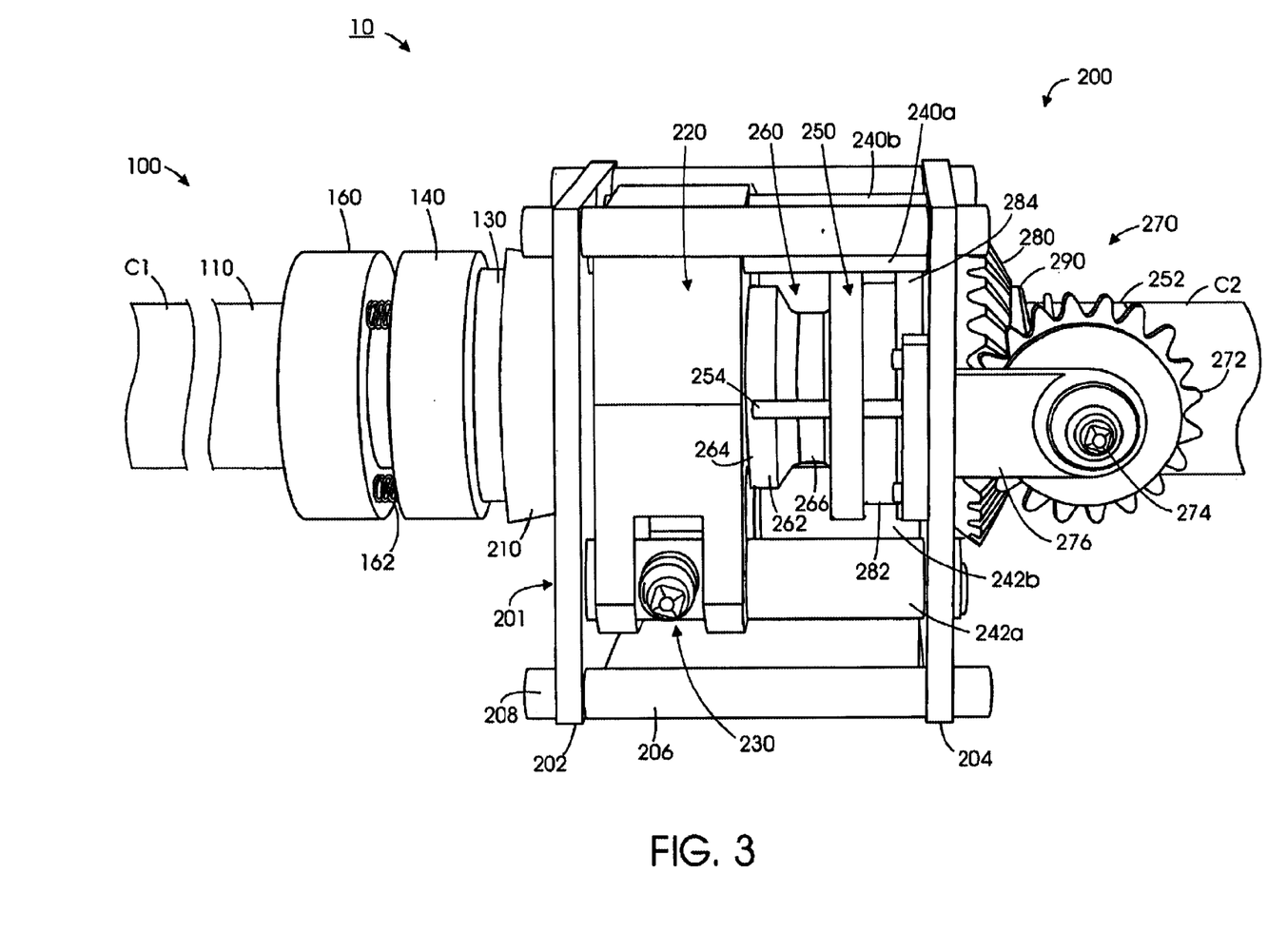
FIG. 3 illustrates the insertion connector coupled to the clamping connector in accordance with the present embodiment of a remotely operable misalignment coupling device.

Referring to FIGS. 1 through 3, an embodiment of a remotely operable misalignment coupling device 10 in accordance with the present invention is illustrated. The device 10 of the present invention includes two, interconnectable components 100 and 200 that connect together as shown in FIG. 3 to form a flwd-tight connection for conveying fluid between separate devices (not shown), such as pipes or equipment connections. The two components include a first, insertion connector 100 best shown in FIG. 1 and include a second, clamping connector 200 best shown in FIG. 2. It will be appreciated that the terms, "insertion" and "clamping," are not indicative of any limitation of function or placement.

In the practice of the invention, the insertion connector 100 and the clamping connector 200 mechanically attach together. When attached, the connectors 100 and 200 form a fluid-tight connection and allow fluid to be conveyed without leakage. The present invention contemplates that the fluid may be pressurized. The connectors 100 and 200 may be separated by reversing the mechanical attachment and may be attached to other compatibly configured components without modification.

The insertion connector 100 and the clamping connector 200 of the present invention are each configured to attach to or connect with a separate device C1 and C2 used to convey fluid. Such devices C1 and C2 may include, but are not limited to, pipes or similar conduits. The attachment of the conduits C1 and C2 to the connectors 100 and 200 may be made by conventional or known means, such as butt welding.

The insertion connector 100 is configured to be positioned into the clamping connector 200. In common nomenclature, the insertion connector 100 may be termed a "male fitting." As already discussed, the insertion connector 100 is attached to a conduit C1 for conveying fluid, i.e., a pipe. In a preferred embodiment, the interior diameter of the conduit C1 is not diminished or restricted by the attachment or operation of the insertion connector 100. The exterior of the insertion connector 100 may be tapered along its axial length, forming its narrowest outside diameter at the distal end that is first directed and placed within the clamping connector 200.

The insertion connector 100 as shown in FIG. 1, may include one or more continuous indentations or grooves 126 along the outer circumference and normal to the axis of the insertion connector 100. The insertion connector 100 may also include one or more continuous ridges or circumferential flanges 122 along the outer circumference and normal to the axis of the insertion connector 100. These ridges or flanges 122 and grooves 126 may be utilized in conjunction with or placement of fluid seals or spring devices. It will be appreciated that such fluid seals or spring devices may be used to facilitate the intended fluid-tight connection between the insertion connector 100 and the clamping connector 200, as well as to facilitate the attachment and detachment of the coupling components 100 and 200 of the present invention.

In one embodiment of the present invention, the insertion connector 100 may include a seal 152 affixed to an outer spherically shaped sub-component or ball end 150. The ball end 150 may be connected to a circumferential flange 122 of a larger diameter. The insertion connector 100 may include a continuous groove 126 normal to the axis of the insertion connector 100 and parallel to the aforementioned flange 122. It will be readily appreciated at this point that when connected with comparable attachment hardware of the clamping connector 200, this groove-flange combination will serve as a mechanism to grip the insertion connector 100 and restrict its motion along an axial direction. It will also be appreciated that this groove-flange combination increases the surface area available for contact between the insertion connector and the clamping connector.

The insertion connector 100 may also include a broadened guide 140, creating an increased diameter of the connector 100 as the distance from the distal end increases. This conical design facilitates the placement or hard landing of the insertion connector 100 into the clamping connector 200. The conical design is further advantageous when coupling is attempted while the two connectors 100 and 200 are not oriented on the same axis. The insertion connector 100 may also contain one or more shoulders 160 consisting of flanges of increased diameter that may serve as "stops" to the axial movement of the insertion connector into the clamping connector 200. As already mentioned, the insertion connector 100 may also incorporate a spring device 162 that will facilitate the connection of the insertion connector 100 and the clamping connector 200.

The clamping connector 200, as shown in FIG. 2, is configured to be fit over the outside of the insertion connector 100 of FIG. 1. In simple terms, the interior configuration of the clamping connector 200 mirrors the exterior of the insertion connector 100, thereby including circumferential indentations compatible with the circumferential flanges of the insertion connector 100. Similarly, the interior configuration of the clamping connector 200 includes circumferential ridges or interior protruding flanges that mirror the exterior grooves of the insertion connector 100.

It will be readily appreciated that the matching configurations of the exterior of the insertion connector 100 and the interior of the clamping connector 200 provide surface areas to facilitate the fluid-tight seal between the connectors. The matching configurations also provide convenient and efficient placement of seals to enhance or maintain the fluid-tight seal. Further, it will be readily appreciated that the interrelated flanges and grooves generally provide control and limitation of axial movement between the insertion connector 100 and clamping connector 200.

The clamping connector 200 includes an outwardly expanding guide cone or base 210. The base 210 facilitates the initial entry or hard landing of the narrow, distal end of the insertion connector 100 and is utilized for the initial joining of the connectors 100 and 200. The initial insertion or hard landing can be accomplished while the connectors 100 and 200 are misaligned in axial orientation and prior to final or complete coupling.

Figure 4:
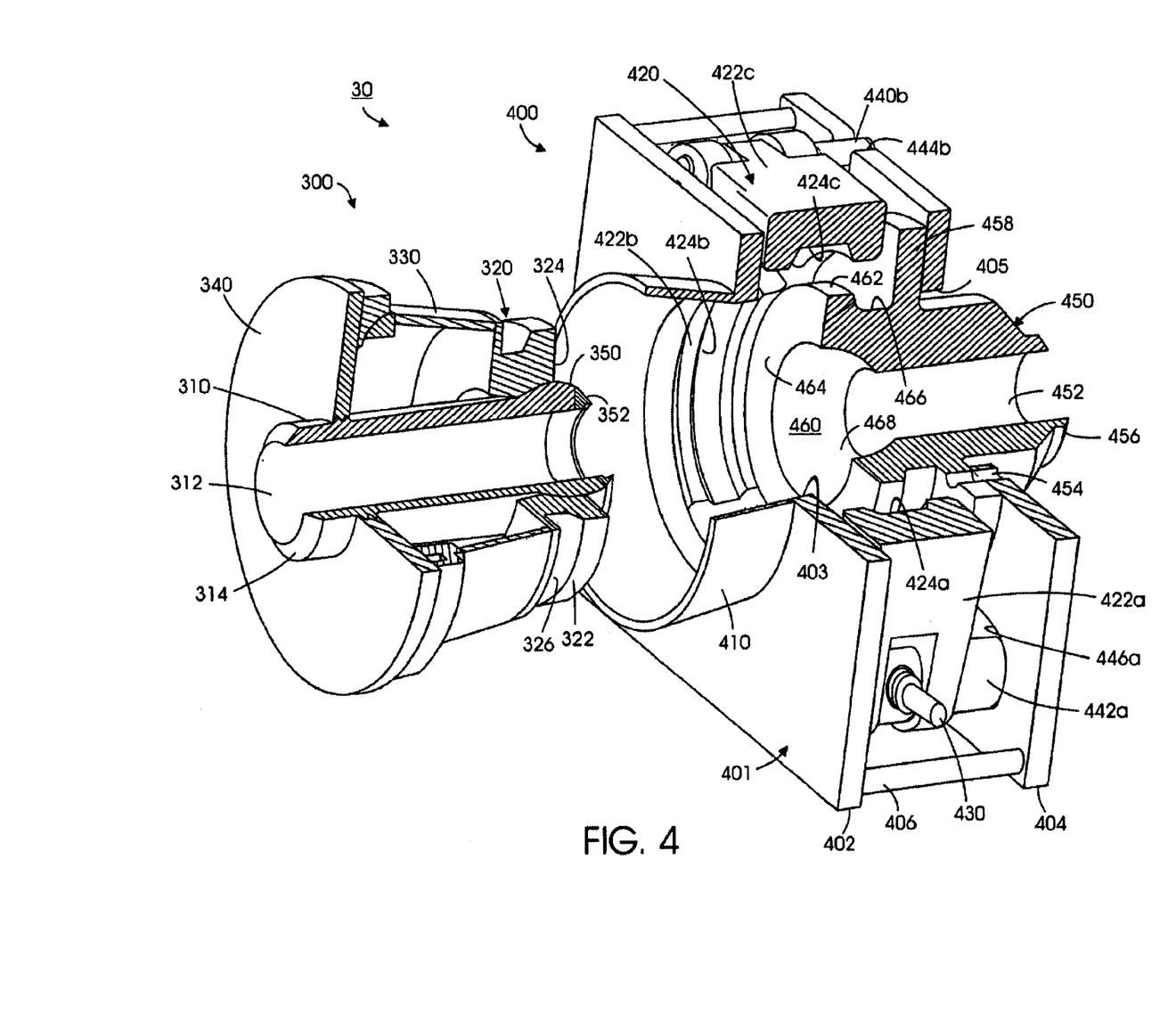
FIG. 4 illustrates another embodiment of the present invention, depicting an insertion connector in relation to a clamping connector.
Figure 5:
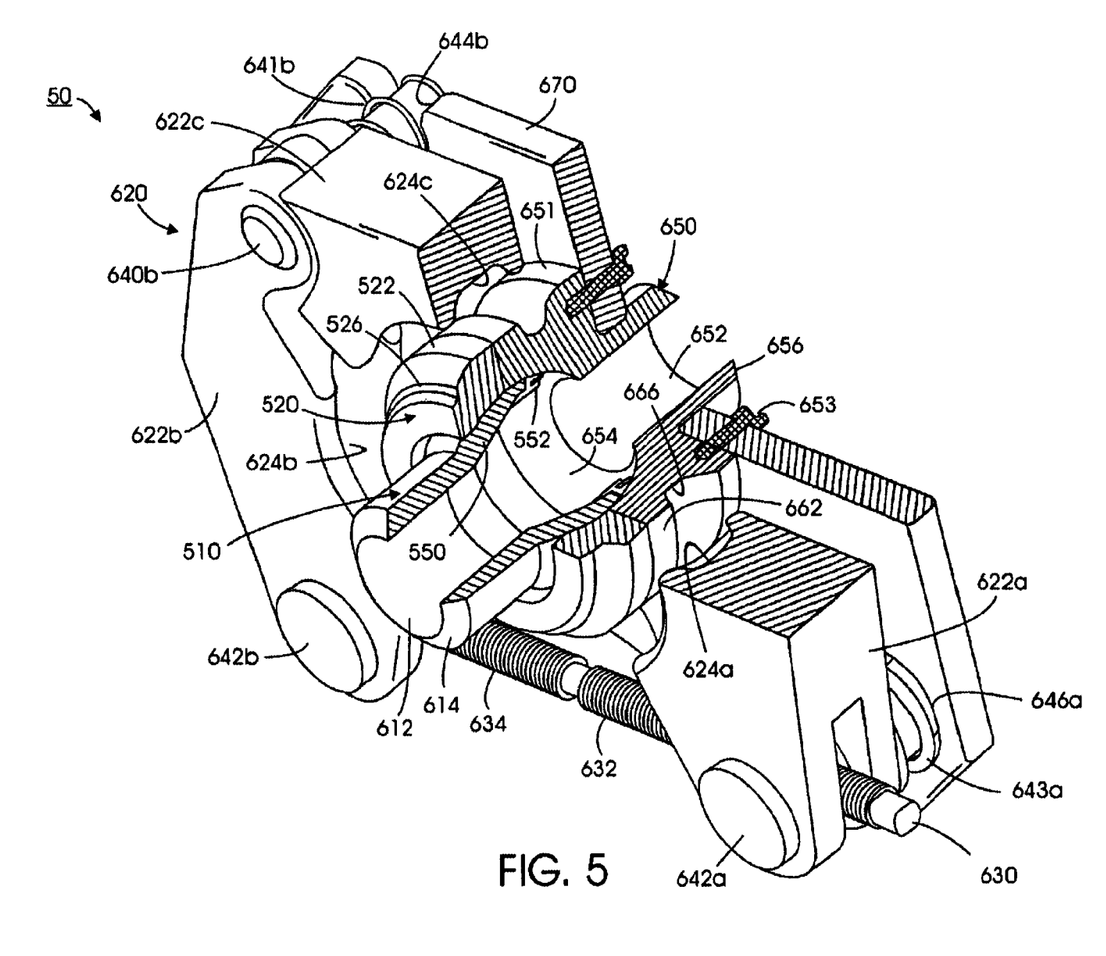
FIG. 5 illustrates yet another embodiment of the present invention, depicting an insertion connector coupled to a clamping connector.

The clamping connector 200 also includes a clamp mechanism 220, such as a three segment, jointed clamp, as best illustrated in the embodiments of FIGS. 4 and 5. The clamp mechanism 220 is opened and closed by use of a drive mechanism 230, such as a double action threaded rod 230. For example, rotation of the threaded rod 230 in a first radial direction may cause two of the clamp segments or "jaws" of the clamp mechanism 220 to close together on a third jaw. As rotation of the threaded rod 230 draws two clamps more closely together, the third jaw also simultaneously rotates to maintain the clamp surface normal to the interior dimension of the annulus containing the insertion connector 100. The combined action of the jaws causes the interior spacing to narrow simultaneously in three directions. Rotation of the threaded rod 230 in the second radial direction may cause a reverse of the above-described action and may open the clamp mechanism 220.

It will be readily appreciated that the rotation of a single drive mechanism 230 can simultaneously and uniformly close the clamping connector 200 upon the insertion connector 100. Further, the drive mechanism 230 may be configured to facilitate its rotation by a remotely controlled mechanical device, such as remotely operated vehicles (ROV's) used in subsea environments. In this manner, the operation of the actual clamping action of the remotely operable misalignment coupling device 10 is greatly simplified. The present invention simplifies the connection of misaligned pipes and eliminates the sequential placement and tightening of multiple bolts or other connecting hardware.

The sequencing of the clamping action and manner or configuration of subcomponents effecting the clamping action may be varied. However, a preferred embodiment is discussed in the explanation of the accompanying drawing.

Referring in particular to FIG. 1, an embodiment of an insertion connector 100 is illustrated in accordance with the present invention. In the present embodiment, the first, insertion connector 100 includes a ball member 110, a floating hub 120, a guide 130, a follower ring 140, and a shoulder 160. The ball member 110 attaches to a conduit C1. The floating hub 120, the guide base 130, the follower ring 140, and the shoulder 160 are all disposed on the ball member 110.

The ball member 110 includes an internal bore therethrough (not shown) that conveys fluid from the conduit c1 to the clamping connector 200 of FIG. 2. The ball member 110 includes a ball end 150. A seal 152 is attached to the ball end 150. Seals, such as the seal 152, for use with the ball end 150 are well known in the art for example, U.S. Pat. No. 5,369,342, which is incorporated herein by reference, discloses one such seal for use between a ball and socket connection.

The floating hub 120 is disposed adjacent the ball end 150. The floating hub 120 includes a flange 122, a mating surface 124 and a groove 126. The guide 140 is disposed between the floating hub 120, and the follower ring 130. The guide 140 has a frusto-conical shape with a larger diameter towards the follower ring 130. The shoulder 160 is disposed adjacent the follower ring 130.

A spring device 162 is mounted upon and rests against the shoulder 160. The spring device 162 presses against the follower ring 130. The action of the spring device 162 aids in snuggly resting the floating hub 120 against the ball end 150. It will be appreciated that the floating hub 120, as best illustrated in the embodiments of FIGS. 4 and 5, has an interior surface compatible with the outer surface of the ball end 150. The seal device 152 is affixed to the outer and leading edge or distal end of the ball end 150. The spring device 162 may also facilitates maintaining the fluid-tight seal by exerting a positive force upon the floating hub 120 and hence upon the ball end 150 and seal 152 configuration.

The end of the insertion connector 100 is tapered to facilitate placement into the correspondingly outwardly expanding base 210 of the clamping connector 200, as best shown in FIG. 3. This permits the joining of the insertion connector 100 and clamping connector 200 when misaligned.

In the present embodiment and as best shown in FIG. 2, the clamping connector 200 includes a frame 201, a base 210, a clamp mechanism 220, a drive mechanism 230, an adjustable hub 250, and a soft landing mechanism 270. The frame 201 includes a first plate 202 and a second plate 204 connected by a plurality of connectors 206 and fasteners 208. The base 210 is attached to the first plate 202. The base 210 has a fusto-conical shape. The base 210 circumscribes an opening (not shown) in the first plate 202 that receives the insertion connector 100, as described below and as best illustrated in the embodiment of FIG. 4.

The clamp mechanism 220 is disposed within the frame 201 adjacent the base 210. As described above and as best illustrated in the embodiments of FIGS. 4 and 5, the clamp mechanism 220 of the present embodiment includes three clamp segments. The clamp mechanism 220 is opened and closed by use of the drive mechanism or threaded rod 230. Rotation of the threaded rod 230 in a first radial direction causes two of the clamp segments to close together. As rotation of the threaded rod 230 draws the two clamp segments more closely together, the third clamp segment also simultaneously moves closer to the two clamp segments. The combined action of the clamp segments causes the interior spacing to narrow simultaneously in three directions. Rotation of the threaded rod 230 in the second radial direction causes a reverse of the above-described action and opens the clamp mechanism 220.

The adjustable hub 250 includes an end 252 disposed through the second plate 204 for attachment to a conduit (not shown). The adjustable hub 250 also includes a socket member 260 disposed within the frame 201. The socket member 260 has a second flange 262, a mating surface 264, and a groove 266. Actuated by the soft landing gear 270, the adjustable hub 250 is moved to position the socket member 260 relative to the clamp mechanism 220, as described in more detail below. Movement of the adjustable hub 250 is guided by guide rods 254 attached to the second plate 204.

The soft landing mechanism 270 is attached to the frame 201. The soft landing mechanism 270 of the present embodiment includes a first beveled gear 272, an axis 274, a support 276, a second beveled gear 280, and a worm gear 290. The first beveled gear 272 is attached to the support 276, which is connected to the second plate 204. The first beveled gear 272 is perpendicular to the second beveled gear 280, and the teeth of the first beveled gear 272 are intermeshed with the second beveled gear 280. The second beveled gear 280 is positioned adjacent the second plate 204. An end 282 of the second beveled gear 280 is disposed through the second plate 204. The gear 280 is retained by a flange 284 disposed about the end 282. The worm gear 290 is disposed on the adjustable hub 250. Both the adjustable hub 250 and worm gear 290 pass through an axial bore (not shown) in the second beveled gear 280.

Actuation of the axis 274 rotates the first beveled gear 272, which in turn rotates the second beveled gear 280. The second beveled gear 280 is rotated about the worm gear 290 and the end 252 of the adjustable hub 250 disposed therethrough. Rotation of the second beveled gear 280 causes the worm gear 290 to move axially. Consequently, the adjustable hub 250 is moved axially through the second plate 204 to position the socket member 260 in relation to the clamp mechanism 220.

Referring to FIG. 3, the present embodiment of the invention remotely operable misalignment coupling device 10 is illustrated with the insertion connector 100 inserted into the clamping connector 200. The insertion connector 100 is attached to a conduit or a pipe (not shown). On the insertion connector 100, the shoulder 160, the spring device 162, the follower ring 140, and a portion of the guide 130 are shown.

In this illustration of partially completed coupling, the insertion connector 100 and the clamping connector 200 are shown in axial orientation, after the insertion connector 100 has made a hard landing within the base 210. The soft landing gear 270 is rotated to mate the socket member 260 with the ball end 150 disposed within the clamp mechanism 220. The adjustable top hub 260 is moved to position the socket member 260 against the ball end 150 (not visible in FIG. 3) of the insertion connector 100. The adjustable hub 260 of the clamping connector 200 is moved relative to the clamp mechanism 220 by rotation of the soft landing gear 272. Turning the soft landing mechanism 270 in turn moves the adjustable hub 250 along guide rod 268. As best illustrated and described below in the embodiment of FIG. 5, the ball end 150 and seal 152 are disposed within the socket member 260.

To complete the coupling of the connectors 100 and 200, the drive screw 230 is then rotated to close the clamp mechanism 220 around the flange (not visible in FIG. 3) of the insertion connector 100 and the flange 262 of the clamping connector 200. The closing of the clamp mechanism 220 securely holds the seal 152 and ball end 150 (not visible in FIG. 3) of the insertion connector 100 within a spherical cavity or socket seat (not shown) of the socket member 260 attached to the adjustable hub 250.

Referring to FIG. 4, another embodiment of a remotely operated misalignment coupling device 30 illustrates an insertion connector 300 in relation to a clamping connector 400. The insertion connector 300 includes a ball member 310, a floating of hub 320, and a guide 330.

The ball member 310 includes an axial bore 312 therethrough to convey fluid. One end 314 of the ball member is beveled to attach the member 110 to a conduit (not shown). The other end of the ball member forms a ball end 350. A seal 352 is attached to the ball end 350.

The floating hub 320 is disposed on the ball member 310 adjacent the ball end 350. The floating hub 320 includes a flange 322, a groove 324, and a mating surface 326. The guide 330 is positioned adjacent the floating hub 320. A retaining flange 340 is disposed adjacent the guide 330.

The clamping connector 400 includes a frame 401, a base 410, a clamp mechanism 420, a drive mechanism 430, and an adjustable hub 450. The frame 401 includes a first plate 402 and a second plate 404 connected by a plurality of connectors 406. The base 410 is attached to the first plate 402. The base 410 circumscribes an opening 403 in the first plate 402. The opening 403 and base 410 that receives the insertion connector 300.

The adjustable hub 450 is disposed through an opening 405 in the second plate 404. The adjustable hub 450 has an axial bore 452 therethrough for conveying fluid. A beveled end 456 is provided for attaching the adjustable hub 450 to a conduit (not shown). The adjustable hub 450 includes a base flange 458 and a socket member 460 disposed within the frame 401. The socket member 460 includes a second flange 462, a mating surface 464 and a groove 466, and a spherical seat 468. The spherical seat 468 encompasses the ball end 350 when the connectors 300 and 400 are coupled, as described below and as best illustrated in the embodiment of FIG. 5.

As best described and illustrated in the embodiment of FIGS. 1–3 above, the adjustable hub 450 in the present embodiment also may be movable by a soft landing mechanism (not shown) to position the socket member 460 relative to the clamp mechanism 420. The socket member 460 may be movable from a position adjacent the second plate 404 to a position where the second flange 462 and groove 466 are disposed within the clamp mechanism 430. The movement of the socket member 460 may be guided by one or more guide rods (not shown) disposed in apertures 454 defined in the second plate 404 and passing through holes in the base flange 458.

The clamp mechanism 420 includes three interlinked clamp segments 422a, 422b, and 422c. As best described above and as best illustrated in the embodiment of FIG. 5, the clamp segments 422a–c are pivotally connected to each other by four shafts, only two of which 440b and 442a are visible in the present FIG. 4. The first shaft 440b is disposed through a slot 444b defined in the second plate 404. A similar first shaft (not shown) is disposed in a similar first slot (not shown) on the other end of the clamp segment 422c that has been removed from FIG. 4. The second shaft 442a is disposed in a second slot 446a defined in the second plate 404. A similar second shaft (not shown) is disposed in a similar second slot (not shown) on the other end of the clamp segment 422b that is not visible in FIG. 4. The drive screw 430 passes through trunnions in the second shafts. Rotation of the drive screw 430 opens and closes the clamp mechanism 420.

In the present embodiment, the insertion connector 300 includes the socket member 460 having the internal bore 452 and the socket seat 468. The interior diameter of this socket seat 468 is matched with the outer diameter of the ball end 350 and seal 352 to facilitate a secure, fluid-tight connection. It will, of course, be appreciated that the tapering shape of the insertion connector 300, including the guide 330, and the corresponding flared shape of the clamping connector 400, including the base 410, are compatible and facilitate the secure and fluid-tight connection between the connectors 300 and 400. It will also be appreciated that the action of the spring devices of the insertion connector 300 and the clamping connector 400, alone or in combination, may act to cushion the joining of the two connectors 300 and 400 during the initial insertion sequence.

In one embodiment, the initial insertion sequence will be achieved by hard landing the insertion connector 300 within the clamping connector 400, as best described above with reference to the embodiment of FIG. 3. The next phase of the connecting sequence may then be accomplished. This step comprises the actuation of the soft landing gear (not shown) to move the second flange 462 to securely connect with the first flange 322. The substantially flat mating surface 464 of the socket member 460 is brought to rest in contact with the substantially flat mating surface 324 of the floating hub 320. At this time, the seal 352 and outer spherical surface or ball end 350 is brought into contact with the interior surface of the socket seat 468 of the socket member 460.

The advantage of moving the adjustable hub 450 to securely connect the socket member 460 with the floating hub 320 is the protective nesting that is accomplished between the connection of the ball end 350 and the socket seat 468. It will be appreciated that this enhanced nesting is achieved without diminishing the ability to attach and detach the connection, as well as the ability to connect the components using remotely operated mechanical means.

In addition, the soft landing facilitates other surface areas of the clamping connector 400 and the insertion connector 300 being brought into contact. These other surfaces may be configured to provide additional sealing mechanisms. Examples of surfaces for providing additional sealing mechanisms include the joining of the surfaces of the clamp segments 422a–c with the grooves 326 and 466 and the joining of the surface of the guide 330 with the base 410. Furthermore, the ball end 350 may hold a sealing mechanism 352 that may be placed in contact with the surface of the socket seat 468.

The third phase may then be accomplished by rotation of the clamp drive screw 430, which causes the clamp mechanism 420 to close upon the joined first and second flanges 322 and 462. The shape and dimensions of the interior surfaces 442a–c of the clamp segments 420a–c substantially match the combined shape and dimensions of the joined first and second flanges 322 and 462. When the clamp mechanism 420 is closed, it securely holds the ball end 350 within the socket seat 468. It will be appreciated that an unrestricted and continuous annulus is now formed, comprising the axial bores 312 and 452.

Referring to FIG. 5, yet another embodiment of a remotely operable misalignment coupling device 50 illustrates an insertion connector 500 partially coupled to a clamping connector 600. The insertion connector 500 includes a ball member 510 and a floating hub 520. The ball member 510 includes an axial bore 512 therethrough to convey fluid. The ball member 510 has a beveled end 514 for attaching to a conduit (not shown) and has a ball end 550 for mating with components of the clamping connector 600. A seal 552 is attached to the ball end 550. The floating hub 520 is disposed on the ball member 510 adjacent the ball end 550. The floating hub 520 includes a first flange 522 and a groove 526.

The socket member 650 has an axial bore 652 therethrough for conveying fluid. One end of the axial bore 652 forms a spherical seat 654. The spherical seat 654 encompasses the ball end 550. At the other end of the socket member 650, a beveled end 656 is provided for attaching the socket member 650 to a conduit (not shown).

The socket member 650 includes a base flange 651, a second flange 662, and a groove 666. The socket member 650 is attached to the base plate 670 by fasteners 653. The second flange 662 and groove 666 of the socket member 650 are disposed within the clamp 620.

As illustrated, the first flange 522 of the floating hub 520 and the second flange 622 of the socket member 650 are joined together, and the connectors 500 and 600 are in axial alignment. The spherical surface of the ball end 550 and the seal 552 are contained within the spherical interior surface or socket seat 654 of the socket member 650.

The clamping connector 600 includes a clamp 620, a drive screw 630, a socket member 650, and a base plate 670. As illustrated, the three-sided jointed clamp 620 includes first, second, and third clamp segments 622a, 622b, and 622c. The clamp jaw 622a is pivotally mounted on axis shaft 642a disposed in a slot 646a defined in plate 670. The clamp jaw 622b is also pivotally mounted on axis shaft 642b disposed in a similar slot (not shown). Spring mechanisms, such as springs 641b and 643a, cause the clamp jaws 622a–c to be pushed away from the base plate 670. The stored energy of the spring mechanisms 641 and 643 provides a cushioning action as the insertion connector 500 engages with the clamping connector 600. It will be readily appreciated that this action minimizes jarring impact and possible damages to seals or other components, such as the seal 552, the ball end 550, and the socket seat 654.

The drive screw 630 contains two oppositely directed, threaded portions 632 and 634. As the drive screw 630 is turned on end 635, the clamp jaws 622a and 622b are simultaneously and uniformly pulled together, or alternately, moved apart, by corresponding threaded sub-components or trunnions within the shafts 642a and 642b. It will also be appreciated that the clamp jaw 622b may pivot on the axis of 640b. Similarly, the clamp jaw 625a may pivot upon an axis (not shown).

When the clamp 620 is closed, it securely holds the first and second flanges together and consequently keeps the ball end 550 and seal 552 disposed within the seat 654 of the socket member 650. It will be appreciated that an unrestricted and continuous annulus is now formed, comprising the axial bores 512 and 652. It will also be appreciated that the action of the spring devices 641 and 643 of the clamping connector 600 may act to cushion the joining of the two connectors 300 and 400.

The present invention provides a method and apparatus to securely connect piping or other fluid conveying conduits for a fluid-tight connection. The present invention uses hardware and components that may be manipulated by remotely controlled devices or tools. The remotely operable coupling device minimizes the number of individual attachments or mechanisms required to create a secure, fluid-tight connection. Furthermore, the remotely operable coupling device may be installed in remote or hostile environments, such as at deep ocean depths or other locations of substantial darkness, cold, and rapid or turbulent air or water movement.

Lastly, the present invention provides the ability to interconnect conduits or components that are misaligned. The interconnection is intended to have sufficient mechanical strength to withstand expected loads and strains during the necessary duration of its function in an environment. Such mechanical loads may result from movement of equipment, conduits or other objects interconnected by the coupling device of the present invention. Alternatively, the present invention may have the necessary strength to transfer loads created when portions of equipment or conduits, interconnected by one or more of the coupling devices subject of this invention, are moved, shifted or otherwise relocated as part of normal system maintenance or repair.

The foregoing description of preferred and other embodiments of the present invention is not intended to limit or restrict the breadth, scope, or applicability of the invention that was conceived of by the Applicant. In exchange for disclosing the inventive concepts contained herein, the Applicant desires all patent rights afforded by the appended claims.

What is claimed is:

1. A device for coupling misaligned first and second conduits, comprising:
    a first connector connected to the first conduit and having a first flange disposed about a ball member; and
    a second connector connected to the second conduit and comprising:
        a second flange disposed about a socket member, the socket member receiving the ball member therein and the second flange positioning adjacent the first flange, and
        a first mechanism being operable to retain the first and second flanges adjacent one another and to maintain the ball member in sealed engagement with the socket member,
    wherein the first connector comprises a guide having a narrower end adjacent to the first flange and wherein the second connector comprises a base having a narrower end adjacent to the first mechanism and receiving the guide therein.

2. The coupling device of claim 1, wherein the second connector further comprises a second mechanism operable to engage the socket member with the ball member and to position the second flange adjacent the first flange.

3. The coupling device of claim 2, wherein the second mechanism comprises one or more gears being remotely operable to move the second flange and socket member in relation to the ball member and first flange of the first connector.

4. The coupling device of claim 1, wherein the first mechanism comprises a clamp having a plurality of movable clamp segments.

5. The coupling device of claim 4, wherein the clamp comprises a drive screw being remotely operable to open and close the clamp.

6. The coupling device of claim 5, wherein the drive screw comprises first and second threaded portions having opposite pitch and passing through trunnions in at least two of the movable clamp segments.

7. A device for coupling misaligned first and second conduits, comprising:
 a first connector connected to the first conduit and having a first flange disposed about a ball member; and
 a second connector connected to the second conduit and comprising:
  a second flange disposed about a socket member, the socket member receiving the ball member therein and the second flange positioning adjacent the first flange, and
  a first mechanism being operable to retain the first and second flanges adjacent one another and to maintain the ball member in scaled engagement with the socket member,
 wherein the second connector further comprises a second mechanism operable to engagement the socket member with the ball member and to position the second flange adjacent the first flange, and
 wherein the second mechanism comprises one or more gears being remotely operable to move the second flange and socket member in relation to the ball member and first flange of the first connector.

8. The coupling device of claim 7, wherein the first connector comprises a guide having a narrower end adjacent to the first flange and wherein the second connector comprises a base having a narrower end adjacent to the first mechanism and receiving the guide therein.

9. The coupling device of claim 7, wherein the first mechanism comprises a clamp having a plurality of movable clamp segments.

10. The coupling device of claim 9, wherein the clamp comprises a drive screw being remotely operable to open and close the clamp.

11. The coupling device of claim 10, wherein the drive screw comprises first and second threaded portions having opposite pitch and passing through trunnions in at least two of the movable clamp segments.

12. A device for coupling misaligned first and second conduits, comprising:
 a first connector connected to the first conduit and having a first flange disposed about a ball members; and
 a second connector connected to the second conduit and comprising:
  a second flange disposed about a socket member, the socket member receiving the ball member therein and the second flange positioning adjacent the first flange, and
  a first mechanism being operable to retain the first and second flanges adjacent one another and to maintain the ball member in sealed engagement with the socket member,
 wherein the first mechanism comprises a clamp having a plurality of movable clamp segments,
 wherein the clamp comprises a drive screw being remotely operable to open and close the clamp, and
 wherein the drive screw comprises first and second threaded portions having opposite pitch and passing through trunnions in at least two of the movable clamp segments.

13. The coupling device of claim 12, wherein the first connector comprises a guide having a narrower end adjacent to the first flange and wherein the second connector comprises a base having a narrower end adjacent to the first mechanism and receiving the guide therein.

14. The coupling device of claim 12, wherein the second connector further comprises a second mechanism operable to engage the socket member with the ball member and to position the second flange adjacent the first flange.

15. The coupling device of claim 14, wherein the second mechanism comprises one or more gears being remotely operable to move the second flange and socket member in relation to the ball member and first flange of the first connector.

16. A device for coupling misaligned first and second conduits, comprising:
 a first connector comprising:
  a ball member attached to the first conduit; and
  a first flange disposed on the ball member; and
 a second connector receiving the first connector and comprising:
  a socket member attached to the second conduit,
  a second flange disposed on the socket member,
  a soft landing mechanism being operable to engage the socket member with the ball member and to position the second flange adjacent to the first flange, and
  a coupling mechanism being operable to retain the first and second flanges adjacent and to maintain the ball member and socket member in fluid-tight engagement.

17. The device of claim 16, wherein the first connector comprises a guide having a frusto-conical shape with a narrower end adjacent the first flange.

18. The device of claim 17, wherein the second connector comprises a base receiving the first connector therethrough and having a frusto-conical shape with a narrower end adjacent to the coupling mechanism.

19. The device of claim 17, wherein a drive mechanism remotely operates the coupling mechanism.

20. The device of claim 19, wherein the coupling mechanism comprises a clamp having movable clamp segments.

21. The device of claim 20, wherein the drive mechanism comprises a drive screw passing through trunnions in two of the movable clamp segments.

22. The device of claim 21, wherein the drive screw comprises first and second threaded portions having different pitch and wherein each threaded portion is threaded into one of the trunnions of the two movable clamp segments.

23. The device of claim 16, wherein the first connector comprises a spring device urging the first flange against the ball member.

24. The device of claim 16, wherein the ball member comprises a seal facilitating fluid-tight engagement with a socket seat of the socket member.

25. The device of claim 16, wherein the soft landing mechanism comprises one or more gears to move the socket member and second flange relative to the ball member and first flange inserted within the coupling mechanism.

26. A method for remotely coupling misaligned first and second conduits comprising the steps of:
  inserting a first connector attached to the first conduit into a second connector attached to the second conduit;
  engaging a socket member disposed in the second connector with a ball member disposed on the first connector by operating a soft landing mechanism; and
  retaining the ball and socket members in fluid-tight engagement by operating a coupling mechanism.

27. The method of claim 26, wherein inserting the first connector into the second connector comprises the step of hard landing a guide on the first connector into a base on the second connector.

28. The method of claim 26, wherein operating the soft landing mechanism comprises the step of rotating a gear to move the socket member adjacent the ball member.

29. The method of claim 26, wherein operating the coupling mechanism comprises the step of rotating a drive screw to close a clamp about flanges disposed on the adjacent ball and socket members.

* * * * *

UNITED STATES PATENT AND TRADEMARK OFFICE
CERTIFICATE OF CORRECTION

PATENT NO. : 6,682,105 B2  Page 1 of 1
DATED : January 27, 2004
INVENTOR(S) : Latham et al.

It is certified that error appears in the above-identified patent and that said Letters Patent is hereby corrected as shown below:

Column 3,
Line 18, please replace "flwd-tight" with -- fluid-tight --.

Column 11,
Line 37, please replace "engagement" with -- engage --.

Signed and Sealed this

Ninth Day of March, 2004

JON W. DUDAS
*Acting Director of the United States Patent and Trademark Office*